(12) United States Patent
Rangaprasad et al.

(10) Patent No.: US 12,209,902 B1
(45) Date of Patent: Jan. 28, 2025

(54) ENVIRONMENT CLASSIFICATION BASED ON LIGHT ASSESSMENT

(71) Applicant: Apple Inc., Cupertino, CA (US)

(72) Inventors: Arun Srivatsan Rangaprasad, Sunnyvale, CA (US); Anselm Grundhoefer, Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/238,712

(22) Filed: Aug. 28, 2023

Related U.S. Application Data

(60) Provisional application No. 63/408,808, filed on Sep. 21, 2022.

(51) Int. Cl.
*G01J 1/42* (2006.01)
(52) U.S. Cl.
CPC ..... *G01J 1/4204* (2013.01); *G01J 2001/4266* (2013.01)
(58) Field of Classification Search
CPC ............ G01J 1/4204; G01J 2001/4266; A61B 5/1118
See application file for complete search history.

(56) References Cited

U.S. PATENT DOCUMENTS

| | | | |
|---|---|---|---|
| 2014/0179298 A1 | 6/2014 | Grokop et al. | |
| 2017/0131141 A1 | 5/2017 | Wu et al. | |
| 2020/0022239 A1* | 1/2020 | Hung | H05B 45/14 |
| 2022/0128399 A1 | 4/2022 | Xu et al. | |

OTHER PUBLICATIONS

Zhou, Pengfei; Zheng, Yuanqing, Li, Zhenjiang, Li, Mo and Shen, Guobin; "IODetector: A Generic Service for Indoor Outdoor Detection"; SenSys'12, Nov. 6-9, 2012, Toronto, ON, Canada, pp. 1-14.

* cited by examiner

*Primary Examiner* — Kevin K Pyo
(74) *Attorney, Agent, or Firm* — Thompson Hine LLP

(57) ABSTRACT

Various implementations disclosed herein include devices, systems, and methods that determine a type of environment based on light assessment. For example, an example process may include obtaining a first set of light data from a first sensor (e.g., a multiwavelength ambient light sensor) in a physical environment that includes a light source. The first set of light data may identify diffuse light in each of multiple light wavelength ranges that is received by the first sensor. The process may further include obtaining a second set of data from the second sensor in the physical environment. The process may further include determining, based on the first set of light data and the second set of data, that the physical environment is a first type of environment (e.g., indoor) or a second type of environment (e.g., outdoor) based on a set of criteria (e.g., artificial light vs. sunlight).

21 Claims, 9 Drawing Sheets

ENVIRONMENT CLASSIFICATION BASED ON LIGHT ASSESSMENT

This application claims the benefit of U.S. Provisional Application Ser. No. 63/408,808 filed Sep. 21, 2022, which is incorporated herein in its entirety.

TECHNICAL FIELD

The present disclosure generally relates to electronic devices, and in particular, to systems, methods, and devices for determining a type of environment based on light assessment of the environment.

BACKGROUND

Electronic devices may determine a type of light (e.g., artificial, sunlight, etc.) and/or a type of environment (e.g., indoor vs. outdoors), which may provide various benefits. Indoor-outdoor detection may be important to several applications such as localization, contextual understanding, trigger or input signal to start several algorithms/applications, health of the device, etc. The implementation of localization on a mobile device, such as a smartphone, for example, allows a user and/or applications on the device to locate the device's position and/or assist with navigation within a physical environment, such as a building.

SUMMARY

Indoor-outdoor detection may be determined using sensors on the device (e.g., inertial measurement unit (IMU), gyroscope, etc.), WIFI localization, or other techniques (e.g., visual inertial odometry (VIO) from image data). A global positioning system (GPS) system can also provide an approximate position of the mobile device, however, GPS is usually limited indoor due to the degradation of signals by the building structures. Additionally, existing techniques for indoor-outdoor detection may be inefficient and require higher computation with increased power consumption using a mobile device, for example, based on a user capturing photos or video or other sensor data while walking around a room. Moreover, existing techniques may fail to provide sufficiently accurate and efficient approximate indoor-outdoor detection in real time environments when there is a need for fast indoor-outdoor detection.

Various implementations disclosed herein include devices, systems, and methods that involve environment classification based on using low power sensors of an electronic device (e.g., a mobile device such as a smartphone). The sensors may include an ambient light sensor (ALS), such as a multiwavelength ALS to determine if the device is indoors or outdoors based on analyzing the spectral properties of the light (e.g., multiwavelength information) in an environment to differentiate between sunlight, artificial light (e.g., light emitting diodes (LEDs), incandescent, fluorescent, etc.), and window filtered sunlight (e.g., sunlight shining through a window inside of a room). The use of a multiwavelength ALS may provide improved accuracy compared to systems and techniques that use lux values compared to a lux threshold. Other lower power sensors may include a flicker sensor, an ultraviolet (UV) senor, an infrared (IR) sensor, a combination UV/IR sensor, and the like.

In some implementations, integration of multiple sensor data can improve accuracy and robustness of indoor/outdoor determination compared to only an ALS. Other sensors and sensor data may be leveraged which may be always-on and used for other applications. For example, other sensor data may include flicker data from a flicker sensor that may be used to determine if the ambient light is an artificial light that flickers or natural sunlight that does not flicker, eye-tracking cameras on head mounted devices (HMDs) that are sensitive to near-IR to infer sunlight by looking at an iris of an eye to determine if there is any IR reflected ambient scenes to infer if the location is lit by light sources with IR component, or to look at a change in skin reflectance under IR to infer if the skin is being illuminated only by IR LEDs on the HMD or an external IR source. In some implementations, sensor data may include motion data from a motion sensor such as a gyroscope, accelerometer, etc. to determine a motion pattern and if motion is associated with a particular activity (walking, driving, etc.). In some implementations, sensor data may include location data such as WiFi/GPS data to determine an exact location, i.e., mapping data to determine whether the current environment is indoors or outdoors. In some implementations, a machine learning model may be used with the data inputs from an ALS (e.g., multiwavelength ALS), ALS plus other sensor data (e.g., flicker/sensitivity sensor data), or a cascade of multiple models.

In general, one innovative aspect of the subject matter described in this specification can be embodied in methods that include the actions of, at an electronic device having a processor, a first sensor, and a second sensor, obtaining a first set of light data from the first sensor of the device in a physical environment comprising a light source, where the first set of light data identifies diffuse light in each of multiple light wavelength ranges that is received by the first sensor in the physical environment. The actions further include obtaining a second set of data from the second sensor in the physical environment. The actions further include determining, based on the first set of light data and the second set of data, that the physical environment is a first type of environment or a second type of environment based on a set of criteria.

These and other embodiments can each optionally include one or more of the following features.

In some aspects, the first sensor is a multiwavelength ambient light sensor (ALS). In some aspects, the first sensor is configured to generate one or more luminance and/or chrominance values corresponding to diffused light from the light source.

In some aspects, the set of criteria comprises a temporal axis and determining that the physical environment is the first type of environment or the second type of environment is based on an analysis of multiple temporal stages along the temporal axis.

In some aspects, determining that the physical environment is a first type of environment or a second type of environment is based on a time of day.

In some aspects, the second sensor comprises an infrared (IR) sensor and the second set of data comprises IR data. In some aspects, the second sensor comprises an ultraviolet (UV) sensor and the second set of data comprises UV data. In some aspects, the second set of data comprises location information. In some aspects, the second set of data comprises depth data and light intensity image data obtained during a scanning process.

In some aspects, determining that the physical environment is the first type of environment or the second type of environment is based on determining a scene understanding of the physical environment based on the depth data and light intensity image data.

In some aspects, determining that the physical environment is the first type of environment or the second type of environment is based on determining that the light source is sunlight, artificial light, or sunlight filtered through a window.

In some aspects, determining that the light source is sunlight, artificial light, or sunlight filtered through a window is based on a comparison of the first set of light data with stored light spectrum profiles that indicate types of light that include sunlight, artificial light, and sunlight filtered through a window. In some aspects, the light spectrum profiles are updated based on historical data.

In some aspects, determining that the physical environment is the first type of environment or the second type of environment includes obtaining one or more light spectrum profiles associated with the first type of environment and one or more light spectrum profiles associated with the second type of environment, identifying specific features of a light spectrum profile associated with the first set of light data, and determining that the physical environment is the first type of environment or the second type of environment based on a comparison of the specific features of a light spectrum profile associated with the first set of light data with features associated with the one or more light spectrum profiles associated with the first type of environment and one or more light spectrum profiles associated with the second type of environment. In some aspects, the light spectrum profiles are updated based on historical data.

In some aspects, the first type of environment comprises an indoor environment. In some aspects, the second type of environment comprises an outdoor environment. In some aspects, the set of criteria comprises determining that the physical environment is a first known location or a second known location based on the first set of light data and the second set of data.

In general, one innovative aspect of the subject matter described in this specification can be embodied in methods that include the actions of, at an electronic device having a processor and one or more sensors, obtaining sensor data of a head or a face from the one or more sensors of the electronic device in a physical environment comprising a light source, the sensor data corresponding to reflections of diffuse light off of the head or the face received by the one or more sensors. The actions may further include determining, based on the reflections of diffuse light off of the head or the face, that the physical environment is a first type of environment or a second type of environment based on a set of criteria.

These and other embodiments can each optionally include one or more of the following features.

In some aspects, at least one sensor of the one or more sensors is a multiwavelength ambient light sensor (ALS). In some aspects, at least one sensor of the one or more sensors is configured to generate one or more luminance and/or chrominance values corresponding to diffused light from the light source.

In some aspects, the set of criteria comprises a temporal axis and determining that the physical environment is the first type of environment or the second type of environment is based on an analysis of multiple temporal stages along the temporal axis. In some aspects, determining that the physical environment is a first type of environment or a second type of environment is based on a time of day.

In some aspects, at least one sensor of the one or more sensors comprises an infrared (IR) sensor and the sensor data comprises IR data. In some aspects, at least one sensor of the one or more sensors comprises an ultraviolet (UV) sensor and the sensor data comprises UV data.

In some aspects, the sensor data comprises depth data and light intensity image data obtained during a scanning process.

In some aspects, determining that the physical environment is the first type of environment or the second type of environment is based on determining a scene understanding of the physical environment based on the depth data and light intensity image data.

In some aspects, determining that the physical environment is the first type of environment or the second type of environment is based on determining that the light source is sunlight, artificial light, or sunlight filtered through a window.

In some aspects, determining that the light source is sunlight, artificial light, or sunlight filtered through a window is based on a comparison of the sensor data with stored light spectrum profiles that indicate types of light that include sunlight, artificial light, and sunlight filtered through a window. In some aspects, the light spectrum profiles are updated based on historical data.

In some aspects, determining that the physical environment is the first type of environment or the second type of environment includes obtaining one or more light spectrum profiles associated with the first type of environment and one or more light spectrum profiles associated with the second type of environment, identifying specific features of a light spectrum profile associated with the first set of light data, and determining that the physical environment is the first type of environment or the second type of environment based on a comparison of the specific features of a light spectrum profile associated with the first set of light data with features associated with the one or more light spectrum profiles associated with the first type of environment and one or more light spectrum profiles associated with the second type of environment. In some aspects, the light spectrum profiles are updated based on historical data.

In some aspects, the first type of environment comprises an indoor environment. In some aspects, the second type of environment comprises an outdoor environment.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
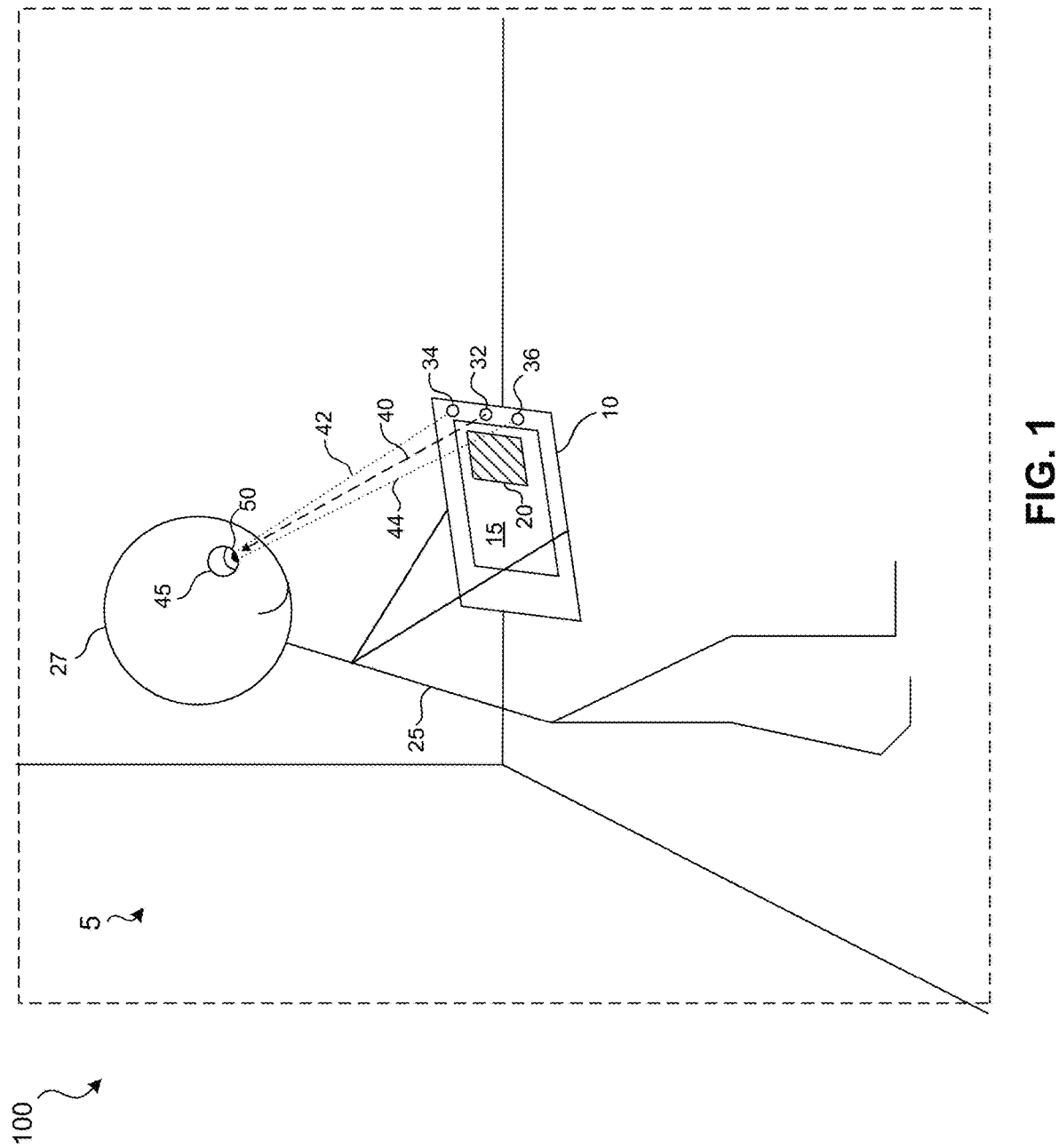
FIG. 1 illustrates a device displaying content and obtaining physiological data from a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example environment 100 of a real-world environment 5 (e.g., a room) including a device 10 with a display 15. In some implementations, the device 10 displays content 20 to a user 25. For example, content 20 may be a button, a user interface icon, a text box, a graphic, an avatar of the user or another user, etc. In some implementations, the content 20 can occupy the entire display area of display 15.

The device 10 obtains image data, motion data, and/or physiological data (e.g., pupillary data, facial feature data, etc.) from the user 25 via one or more sensors (e.g., sensor 34, sensor 36). For example, the device 10 includes a light source 32 (e.g., a light-emitting diode (LED) that may be used to illuminate specular and diffusive parts of the eye 45 of the user 25 via light rays 40 (e.g., infrared (IR) light). Based on the specular illumination of the eye 45, the device 10 may obtain eye gaze characteristic data 42 via a high-power sensor 34, such as a complementary metal oxide semiconductor (CMOS). Additionally, or alternatively, the device 10 may obtain eye gaze characteristic data 44 via a low-power sensor 36, such as a photodiode.

While this example and other examples discussed herein illustrate a single device 10 in a real-world environment 5, the techniques disclosed herein are applicable to multiple devices as well as to other real-world environments. For example, the functions of device 10 may be performed by multiple devices, with a high-power sensor 34, a low-power sensor 36, and a light source 32 on each respective device, or divided among them in any combination.

In some implementations, as illustrated in FIG. 1, the device 10 is a handheld electronic device (e.g., a smartphone or a tablet). In some implementations the device 10 is a laptop computer or a desktop computer. In some implementations, the device 10 has a touchpad and, in some implementations, the device 10 has a touch-sensitive display (also known as a "touch screen" or "touch screen display"). In some implementations, the device 10 is a wearable device such as a head-mounted device (HMD).

In some implementations, the device 10 includes an eye-tracking system for detecting eye position and eye movements via eye gaze characteristic data 42, 44. For example, an eye-tracking system may include one or more IR LEDs (e.g., light source 32), an eye tracking camera (e.g., near-IR (NIR) camera), and an illumination source (e.g., an NIR light source) that emits light (e.g., NIR light) towards the eyes of the user 25. Moreover, the illumination source of the device 10 may emit NIR light to illuminate the eyes of the user 25 and the NIR camera may capture images of the eyes of the user 25. In some implementations, images captured by the eye-tracking system may be analyzed to detect position and movements of the eyes of the user 25, or to detect other information about the eyes such as color, shape, state (e.g., wide open, squinting, etc.), pupil dilation, or pupil diameter. Moreover, the point of gaze estimated from the eye tracking images may enable gaze-based interaction with content shown on the near-eye display of the device 10.

In some implementations, the device 10 has a graphical user interface (GUI), one or more processors, memory and one or more modules, programs or sets of instructions stored in the memory for performing multiple functions. In some implementations, the user 25 interacts with the GUI through finger contacts and gestures on the touch-sensitive surface. In some implementations, the functions include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In some implementations, one or both eyes 45 of the user 25, including one or both pupils 50 of the user 25 present physiological data in the form of a pupillary response (e.g., eye gaze characteristic data 42, 44) detected from a glint analysis. The pupillary response of the user 25 may result in a varying of the size or diameter of the pupil 50, via the optic and oculomotor cranial nerve. For example, the pupillary response may include a constriction response (miosis), e.g., a narrowing of the pupil, or a dilation response (mydriasis), e.g., a widening of the pupil. In some implementations, the device 10 may detect patterns of physiological data representing a time-varying pupil diameter.

In some implementations, the device 10 may detect light reflection data based on light rays from a light source (e.g., artificial light, sunlight, or sunlight filtered through a window). For example, sensor data may include eye-tracking cameras on HMDs that are sensitive to near-IR to infer sunlight by looking at an iris of an eye 45 to determine if there is any IR reflected ambient scenes to infer if the location is lit by light sources with IR component, or to look at a change in skin reflectance under IR to infer if the skin is being illuminated only by IR LEDs on the HMD or an external IR source (e.g., artificial light, sunlight, or sunlight filtered through a window). In some implementations, the device 10 may further include an external facing ALS sensor to detect IR light in the environment.

Figure 2A:
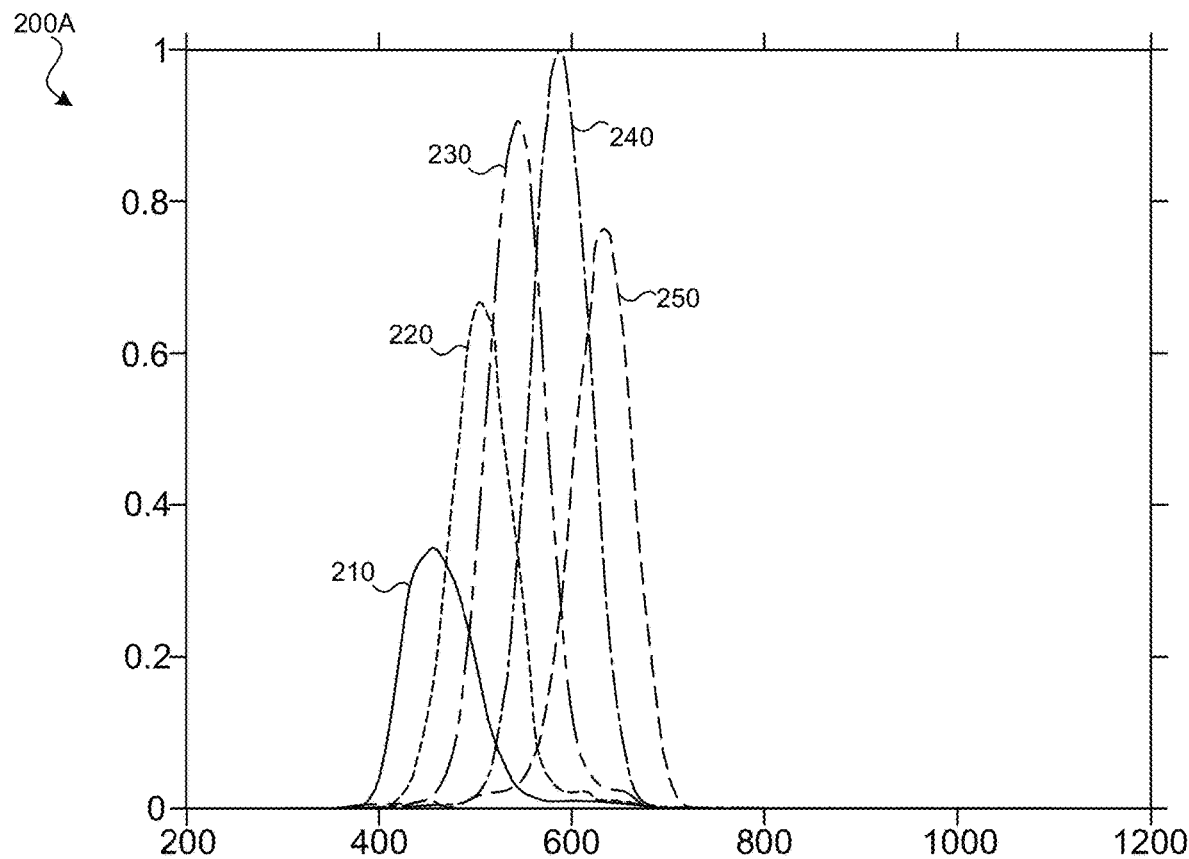
FIGS. 2A and 2B illustrate example graphs of multiwavelength data of a light source as detected by a multiwavelength ambient light sensor (ALS) in accordance with some implementations.
Figure 2B:
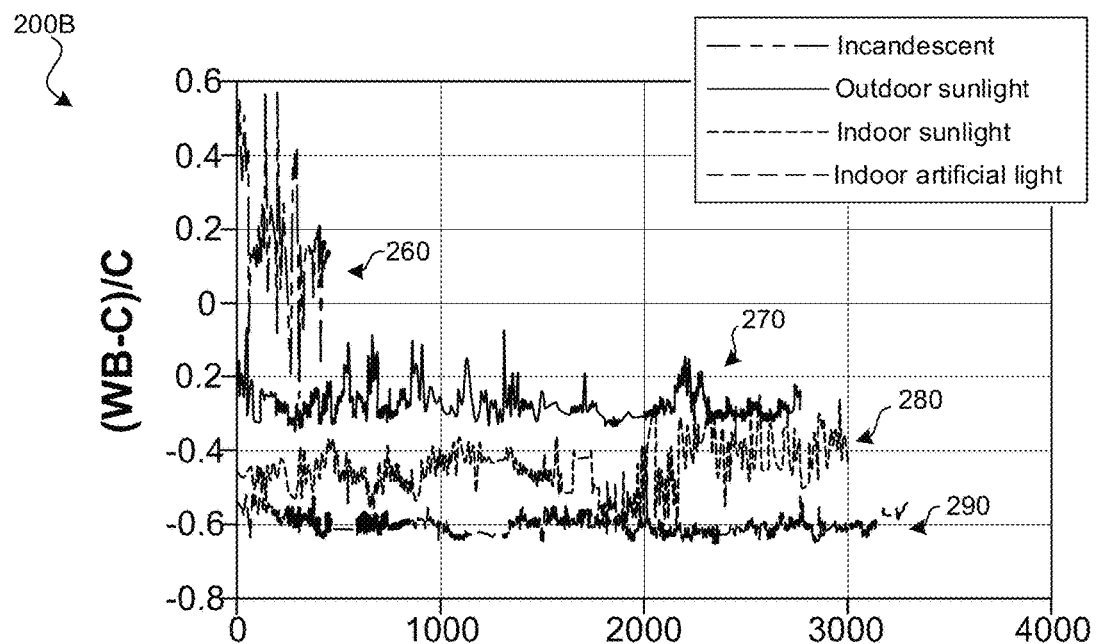

FIGS. 2A and 2B illustrate example graphs of multiwavelength data of a light source as detected by a multiwavelength ambient light sensor (ALS) in accordance with some implementations. Graph 200A illustrates an example data set for wavelength data for different light sources such as artificial light (e.g., fluorescent, incandescent, LED, discharge lamp, etc.) and sunlight (e.g., from outside or as filtered through a window) as detected by a multiwavelength ALS. For graph 200A, the x-axis is the wavelength (nm) and y-axis is the intensity of light (arbitrary units). For example, LED light is represented by line 210, sunlight filtered through a window is represented by line 220, outdoor sunlight is represented by line 230, discharge lamp light is represented by line 240, and incandescent artificial light is represented by line 250. Similarly, graph 200B is another example data set for wavelength data for different light sources such as artificial light (e.g., fluorescent, incandescent, LED, discharge lamp, etc.) and sunlight (e.g., from outside or as filtered through a window) as detected by a multiwavelength ALS. For graph 200B, the x-axis is the index of the data point and the y-axis is "(WB-C)/C" which indicates the intensity ratio of the component of IR to visible light. For example, incandescent artificial light is represented by line 260, outdoor sunlight is represented by line 270, indoor sunlight (e.g., sunlight filtered through a window) is represented by line 280, indoor artificial light (e.g., fluorescent, LED, discharge lamp, etc.) is represented by line 290. The datasets as illustrated in graphs 200A and 200B provide a visual indication that the spectral properties of light can aide in determining whether the light source is an indoor environment or an outdoor environment.

Figure 3C:
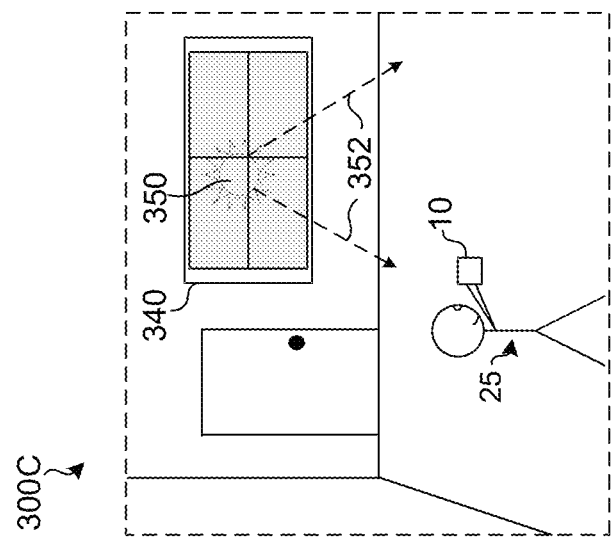
FIGS. 3A-3C illustrate the device of FIG. 1 in different example operating environments that each include a different type of a light source, in accordance with some implementations.
Figure 3B:
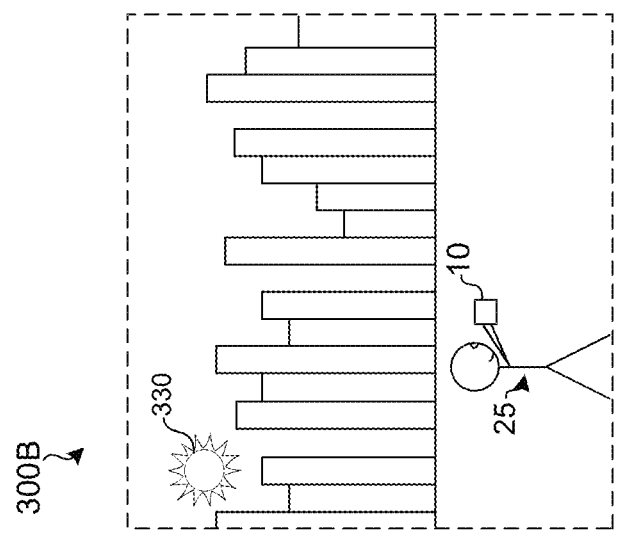
Figure 3A:
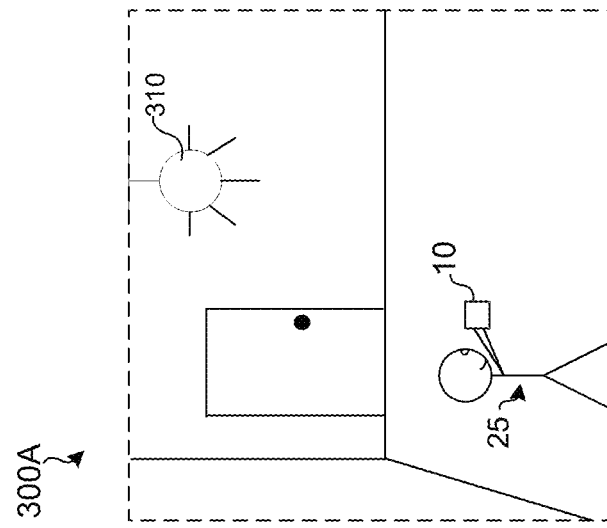

FIGS. 3A-3C illustrate the device of FIG. 1 (e.g., device 10) in different example operating environments 300A, 300B, 300C, respectively, that each include a different type of a light source, in accordance with some implementations. In particular, environment 300A illustrates the user 25 in an indoor setting with a single light source 310. For example, light source 310 represents a light source such as artificial light (e.g., fluorescent, incandescent, LED, discharge lamp, etc.). Environment 300B illustrates the user 25 in an outdoor setting (e.g., a park with a city landscape in the background) with a light source 330 (e.g., the sun). Environment 300C illustrates the user 25 in an indoor setting (e.g., a living room with a window 340) with a light source 350 (e.g., the sun) illuminating the room with sunlight.

Figure 4A:
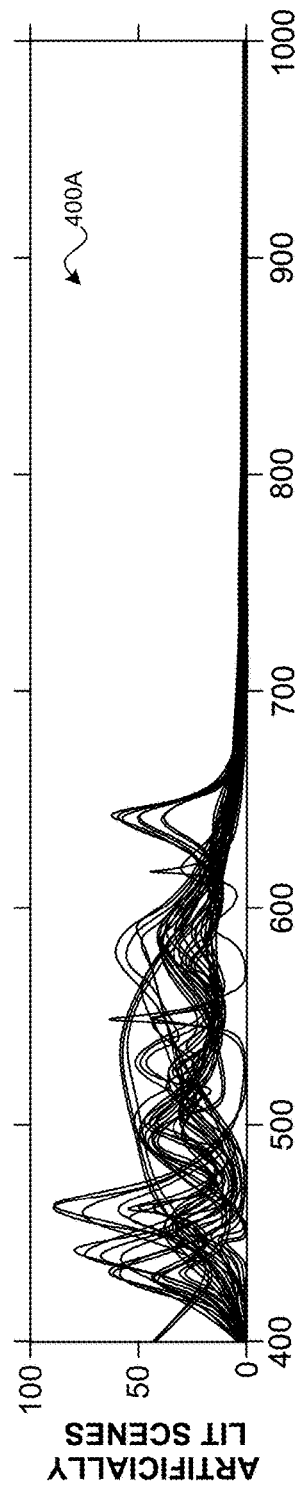
FIGS. 4A-4C illustrate example graphs of the spectral properties for three different types of light sources for the three different environments of FIGS. 3A-3C, respectively, in accordance with some implementations.
Figure 4B:
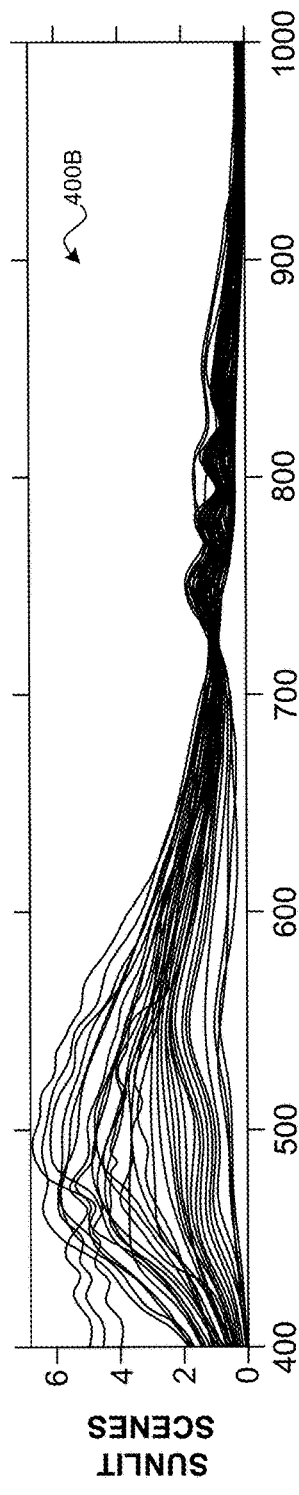
Figure 4C:
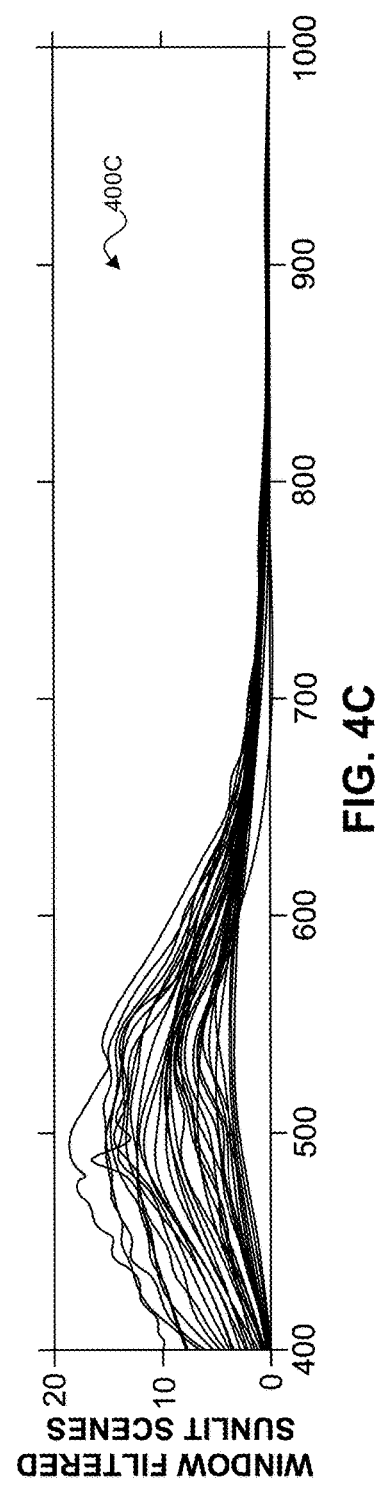

FIGS. 4A-4C illustrate example graphs 400A, 400B, 400C, respectively, of the spectral properties for three different types of light sources associated with the three different environments 300A, 300B, 300C, of FIGS. 3A-3C, respectively, in accordance with some implementations. Each graph 400A, 400B, and 400C may also be referred to herein as a light spectrum profile and illustrates IR, VL, and UL spectrums together into a single profile for the different features or properties of light for wavelengths of the visible light spectrum (e.g., approximately between 400-1000 nanometers (nm)). For instance, graph 400A illustrates the spectral properties (e.g., wavelength data) of environment 300A for an indoor setting with a single light source 310, such as artificial light (e.g., fluorescent, incandescent, LED, discharge lamp, etc.). Graph 400B illustrates the spectral properties (e.g., wavelength data) of environment 300B for an outdoor setting (e.g., a park with a city landscape in the background) with a light source 330 (e.g., the sun). Graph 400C illustrates the spectral properties (e.g., wavelength data) of environment 300C for an indoor setting (e.g., a living room with a window 340) with a light source 350 (e.g., the sun) illuminating the room with sunlight (e.g., window filtered sunlit scenes).

There are some significant differences between sunlight (e.g., natural daylight) and artificial light (e.g., intensity and spectrum). Some light assessment systems may look at total light intensity of the spectrum, but environment light assessment system described herein utilizes these intensity profiles at the various wavelengths to determine a more accurate assessment of the type of light for a type of environment. For example, the light spectrum profiles illustrated in FIGS. 4A-4C, and other acquired light spectrum profiles, may be utilized by the environment light assessment system described herein to determine a type of environment by comparing obtained light source data for an environment with the spectral properties or features associated with the stored light spectrum profiles. For example, environment light assessment system may analyze the wavelength data across each of the IR, VL, and UL spectrums individually or together as a whole and analyzing specific features of the light spectrum profiles associated with known profiles of different light sources (e.g., indoor artificial light, outdoor sunlight, indoor sunlight, etc.).

In some implementations, the light spectrum profiles illustrated in graphs 400A, 400B, 400C, and other obtained light spectrum profiles, maybe updated based on obtained historical data. In some implementations, historical data may be obtained during use of the environment light assessment system described herein. For example, as different light sources are determined for different environments (e.g., different rooms of a house have different light sources and/or different amounts of sunlight that may enter each respective room via one or more windows), the historical data associated with light spectrum profiles for different environments, or different portions of environments, may be updated. Additionally, or alternatively, in some implementations, acquiring the historical data may include downloading additional data from an external source (e.g., an external server or another device).

Figure 5:
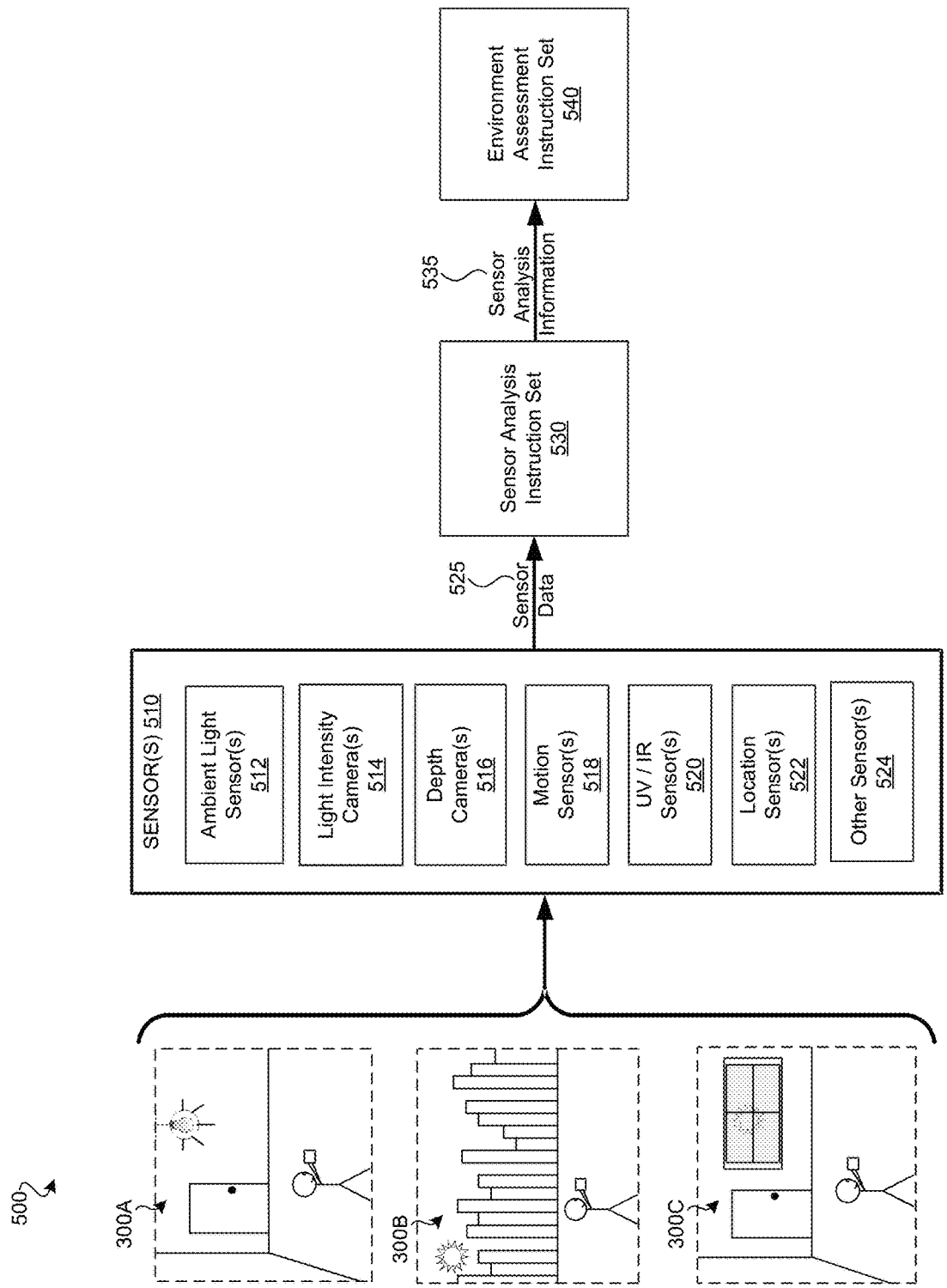
FIG. 5 illustrates a system flow diagram of an environment assessment based on sensor data of an environment that includes a light source in accordance with some implementations.

FIG. 5 illustrates a system flow diagram 500 of an environment assessment based on sensor data of an environment that includes a light source in accordance with some implementations. In some implementations, the system flow of the example environment 500 is performed on a device (e.g., device 10 of FIG. 1), such as a mobile device, desktop, laptop, or server device. In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

In an example implementation, the environment 500 includes an image composition pipeline that acquires or obtains data (e.g., image data from image source(s), ambient light data, motion data, etc.) for a physical environment (e.g., physical environments 300A, 300B, 300C, etc.). Example environment 500 is an example of acquiring image sensor data (e.g., light intensity data, depth data, ambient light data, and motion data) for a plurality of image frames. For example, a user (e.g., user 25) may be walking around a room acquiring sensor data from sensor(s) 510. The image source(s) may include an ambient light sensor 512 that acquires ambient light data (e.g., multiwavelength ALS data), one or more light intensity camera(s) 512 (e.g., RGB camera) that acquires light intensity image data (e.g., a sequence of RGB image frames), one or more depth camera(s) 516 that acquires depth data, a motion sensor 518 that acquires motion data, one or more UV/IR sensors 520 (e.g., a UV and IR sensor that are joined together in a single apparatus, or a separate sensor for UV and IR) that acquires UV and IR data, and other data from other sensors 524.

In some implementations, integration of multiple sensor data (e.g., sensor data 525 from sensors 510) can improve accuracy and robustness of indoor/outdoor determination compared to only an ALS (e.g., ALS(s) 512). Other sensors and sensor data may be leveraged which may be always-on and used for other applications. For example, other sensor data may include eye-tracking cameras (e.g., light intensity camera(s) 514, depth camera(s) 516, UV/IR sensor(s) 520, etc.) on HMDs that are sensitive to near-IR to infer sunlight by looking at an iris of an eye to determine if there is any IR reflected ambient scenes to infer if the location is lit by light sources with IR component, or to look at a change in skin reflectance under IR to infer if the skin is being illuminated only by IR LEDs on the HMD or an external IR source. In some implementations, sensor data may include motion data from a motion sensors/devices (e.g., motion sensor(s) 518) such as a gyroscope, accelerometer, etc. to determine a motion pattern and if motion is associated with a particular activity (walking, driving, etc.).

In some implementations, sensor data may include location data from location sensors/devices (e.g., location sensor(s) 522) such as WiFi/GPS data to determine an exact location, i.e., mapping data to determine whether the current environment is indoors or outdoors. For positioning information, some implementations include a VIO system to determine equivalent odometry information using sequential camera images (e.g., light intensity data from light intensity camera(s) 514) to estimate the distance traveled. Alternatively, some implementations of the present disclosure may include a simultaneous localization and mapping (SLAM) system (e.g., position sensors within the sensors 510). The SLAM system may include a multidimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 500 includes a sensor analysis instruction set 530 that is configured with instructions executable by a processor to obtain sensor data 525 from the one or more sensors 510 (e.g., ambient light data, light intensity data, motion data, etc.) and determines sensor analysis information 535 for the device with respect to a light source using one or more of the techniques disclosed herein. For example, the sensor analysis information 535 may include the determined spectral properties of a detected light source from the respective environment that the device 10 currently is located. The sensor analysis information 535 is sent to the environment assessment instruction set 540. For example, as illustrated by the light spectrum profiles in FIGS. 4A-4C, which show the IR, VL, and UL spectrums together into a single profile for the different features or properties of light for wavelengths of the visible light spectrum, the sensor analysis instruction set 530 can receive and analyze a spectrum of light to identify whether the device is indoors or outdoors. For example, the light spectrum profiles illustrated in FIGS. 4A-4C, and other acquired light spectrum profiles, may be utilized by the sensor analysis instruction set 530 to determine a type of environment by comparing obtained light source data for an environment with the spectral properties or features associated with the stored light spectrum profiles (e.g., graphs 400A, 400B, 400C, and the like).

In an example implementation, the environment 500 includes an environment assessment instruction set 540 that is configured with instructions executable by a processor to obtain sensor analysis information 535 from the sensor analysis instruction set 530 and may determine a type of light (e.g., artificial, sunlight, etc.) and/or a type of environment (e.g., indoor vs. outdoors) using one or more of the techniques disclosed herein. For example, the environment assessment instruction set 540 may be able to quickly determine (e.g., from a low power sensor such as an ALS) whether the device 10 is located indoors or outdoors based on the spectral property analysis of a detected light source from the respective environment that the device 10 currently is located.

In some implementations, the sensor analysis instruction set 530 includes a trained machine learning model that may be used with the data inputs from an ALS 512 (e.g., multiwavelength ALS), ALS 512 plus other sensor data (e.g., flicker/sensitivity sensor data), or a cascade of multiple models based on data from one or more of the sensor(s) 510. For example, the multiple machine learning models may include a Support Vector Machine, a neural network-based model, and the like. In some implementations, there may be multiple models trained for specific sensor types and the inference from all the models may be fused with a cascade of logic or with another machine learning model. In some implementations, a ensemble modeling techniques may be used to aggregate predictions of different algorithms. In some implementations, there may be models trained on general datasets, which may be fine-tuned for a specific user.

Figure 6:
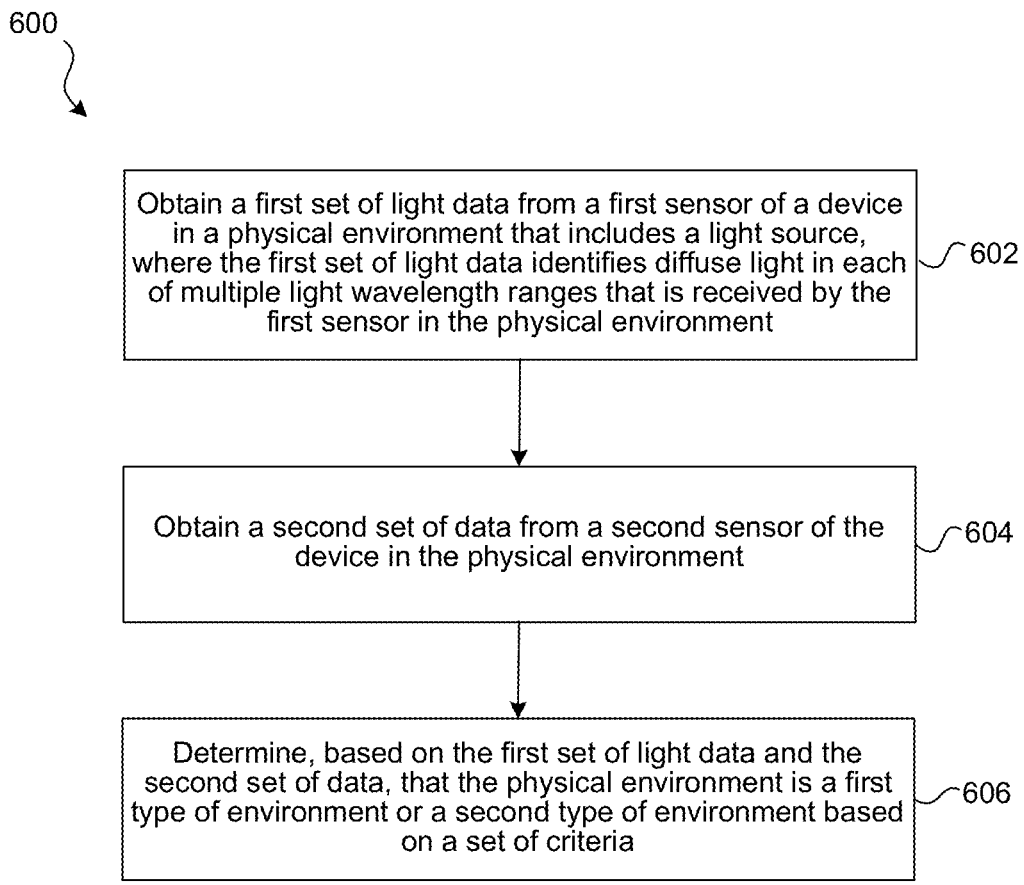
FIG. 6 is a flowchart representation of a method for determining a type of environment based on data from two different sensors in accordance with some implementations.

FIG. 6 is a flowchart illustrating an exemplary method 600. In some implementations, a device (e.g., device 10 of FIG. 1) performs the techniques of method 600 for determining a type of environment based on data from two different sensors in accordance with some implementations. In some implementations, the techniques of method 600 are performed on a mobile device, desktop, laptop, HMD, or server device. In some implementations, the method 600 is performed on processing logic, including hardware, firmware, software, or a combination thereof. In some implementations, the method 600 is performed on a processor executing code stored in a non-transitory computer-readable medium (e.g., a memory). In an exemplary implementation, the techniques of method 600 are performed at an electronic device (e.g., an HMD) having a processor.

At block 602, the method 600 obtains a first set of light data from a first sensor of a device in a physical environment that includes a light source, where the first set of light data identifies diffuse light in each of multiple light wavelength ranges that is received by the first sensor in the physical environment. For example, an multiwavelength ALS provides multiwavelength data and/or one or more luminance/ lux values corresponding to diffuse light coming from a broader direction in the environment. In some implementations, the sensor maybe be an ALS that may have a single sensor or a grid (e.g., 7×7) of sensing elements. In some implementations, the first set of light data (e.g., multiwavelength ALS data) may be directional, e.g., providing a level of ambient light in the direction the sensor is facing (e.g., north) or the level of ambient light in a more discrete region.

In some implementations, the first sensor is a multiwavelength ambient light sensor. In some implementations, the first sensor is configured to generate one or more luminance and/or chrominance values corresponding to diffused light from the light source. In some implementations, the device is an HMD.

At block 604, the method 600 obtains a second set of data from a second sensor of the device in the physical environment. For example, the second set of data may include motion trajectory data generated from an accelerometer, gyroscope, etc.), UV/IR data, flicker data generated from a flicker sensor, IFC camera data, location data from a WiFi/GPS sensor(s), and the like.

In some implementations, the second sensor includes an infrared (IR) sensor and the second set of data includes IR data. In some implementations, the second sensor includes an ultraviolet (UV) sensor and the second set of data includes UV data. In some implementations, the second sensor includes a combination UV/IR sensor (e.g., a UV and IR sensor that are joined together in a single apparatus) and the second set of data includes UV data and IR data (e.g., a detector that senses radiant energy in the short-wave section of both the ultraviolet and infrared portions of the electromagnetic spectrum).

In some implementations, the second set of data includes flicker data. For example, artificial light that is powered by an alternating current (AC) source will inherently show signs of flicker. By utilizing a flicker sensor and detecting flicker data, techniques described herein may identify whether the light source is artificial or not based on the flicker data.

In some implementations, the second set of data includes positioning or location information of the device. For example, a GPS coordinate may be determined using a GPS sensor or a location or positioning information may be determined based on an obtained WiFi signal.

At block 606, the method 600 determines, based on the first set of light data and the second set of data, that the physical environment is a first type of environment or a second type of environment based on a set of criteria. For example, this may involve determining if light source is sunlight, artificial light, or sunlight filtered through a window based on light spectrum profiles of multiwavelength data of a multiwavelength ALS. Additionally, or alternatively, in some implementations, this may involve distinguishing a light source based on spectral properties (IR, VL) and frequency of the light data. For example, as illustrated by the light spectrum profiles in FIGS. 4A-4C, which show the IR, VL, and UL spectrums together into a single profile for the different features or properties of light for wavelengths of the visible light spectrum, the sensor analysis instruction set 530 can receive and analyze a spectrum of light to identify whether the device is indoors or outdoors.

Additionally, or alternatively, in some implementations, determining if light source is sunlight, artificial light, or sunlight filtered through a window may involve detecting light reflected of a user via an HMD, a temporal axis (over time, 1 min, 5 min etc.) to help determine location lighting information, a time of day, a scene understanding, and the like, or a combination of one or more of the aforementioned techniques. The determined light reflections may be based on determining whether there are reflections of diffuse light off of the head or the face (e.g., reflections from the eye and/or skin of the user).

In some implementations, determining that the physical environment is the first type of environment or the second type of environment is based on determining that the light source is sunlight, artificial light, or sunlight filtered through a window. For example, determining that the environment is outside or inside may be based on multiwavelengths data (e.g., from a multiwavelength ALS), lux values, and the like. In some implementations, the first type of environment includes an indoor environment. In some implementations, the second type of environment includes an outdoor environment.

In some implementations, the set of criteria includes determining that the physical environment is a first known location or a second known location based on the first set of light data and the second set of data. For example, some techniques described herein may determine between two different known indoor locations (e.g., office vs home). In some implementations, distinguishing between two different known indoor locations nat be based on a determined "fingerprint" of the light data (intensities or wavelengths) associated with that environment. For example, the office may have a particular type of lighting (e.g., fluorescent tube lights), and a room(s) in a user's home may have a different type of lighting (e.g., LED lights). Thus, the spectral properties of each different environment may be known (e.g., stored data) and recognized quickly based on a determined "fingerprint" (e.g., spectral/multiwavelength properties) of the light data (e.g., via a low powered multiwavelength ALS).

In some implementations, the set of criteria includes a temporal axis and determining that the physical environment is the first type of environment or the second type of environment is based on an analysis of multiple temporal stages along the temporal axis.

In some implementations, determining that the physical environment is a first type of environment or a second type of environment is based on a time of day. For example, based on a user's known or learned scheduled, a user may be more likely to be inside his or her office or place of work between 8 am and 5 pm.

In some implementations, the second set of data includes depth data and light intensity image data obtained during a scanning process. In some implementations, determining that the physical environment is the first type of environment or the second type of environment is based on determining a scene understanding of the physical environment based on the depth data and light intensity image data. For example, a user may scan the environment that he or she is located in, and based on the image data (e.g., light intensity and/or depth), and the first set of data (e.g., ALS data) the techniques described herein can determine a type of environment based on generating a scene understanding of the environment. For example, a scene understanding may be used to determine a context of the experience and/or the environment (e.g., create a scene understanding to determine the objects or people in the content or in the environment, where the user is, what the user is watching, etc.).

In some implementations, integration of multiple sensor data (e.g., the second set of data) can improve accuracy and robustness of indoor/outdoor determination compared to only an ALS. Other sensors and sensor data may be leveraged which may be always-on and used for other applications. For example, other sensor data may include eye-tracking cameras on HMDs that are sensitive to near-IR to infer sunlight by looking at an iris of an eye to determine if there is any IR reflected ambient scenes to infer if the location is lit by light sources with IR component, or to look at a change in skin reflectance under IR to infer if the skin is being illuminated only by IR LEDs on the HMD or an external IR source. In some implementations, sensor data may include motion data from a motion sensor such as a gyroscope, accelerometer, etc. to determine a motion pattern and if motion is associated with a particular activity (walking, driving, etc.). In some implementations, sensor data may include location data such as WiFi/GPS data to determine an exact location, i.e., mapping data to determine whether the current environment is indoors or outdoors. In some implementations, a machine learning model may be used with the data inputs from an ALS (e.g., multiwavelength ALS), ALS plus other sensor data (e.g., flicker/sensitivity sensor data), or a cascade of multiple models.

Figure 7:
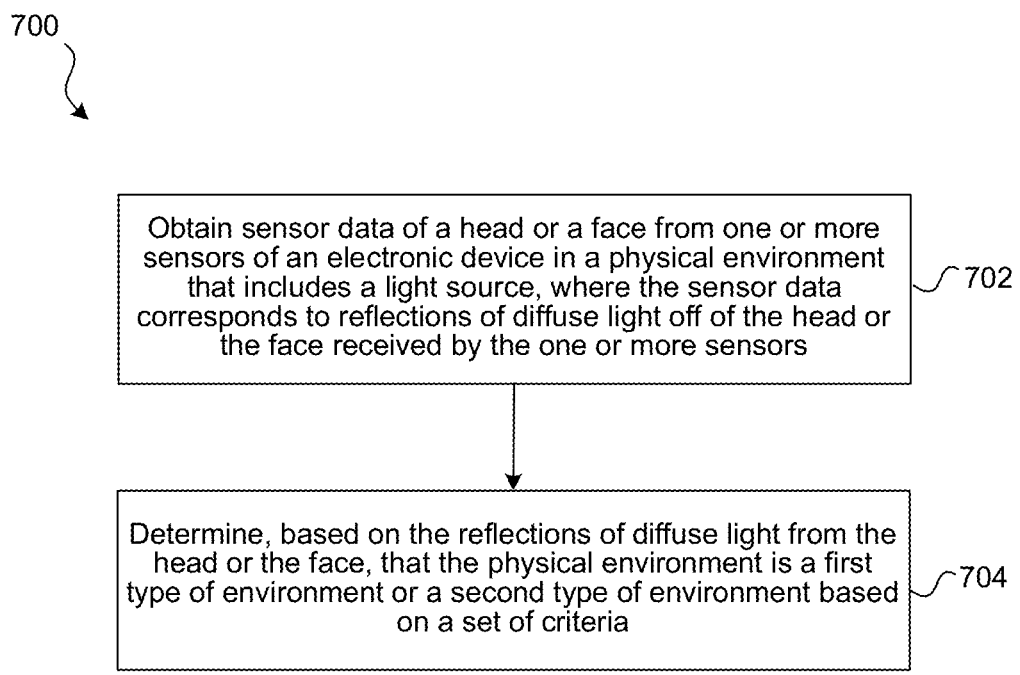
FIG. 7 is a flowchart representation of a method for determining a type of environment based on reflections of diffuse light from a head or a face in accordance with some implementations.

FIG. 7 is a flowchart illustrating an exemplary method 700. In some implementations, a device (e.g., device 10 of FIG. 1) performs the techniques of method 700 for determining a type of environment based on reflections of diffuse light from a head or a face in accordance with some implementations. In some implementations, the techniques of method 700 are performed on a mobile device, desktop, laptop, HMD, or server device. In some implementations, the method 700 is performed on processing logic, including hardware, firmware, software, or a combination thereof. In some implementations, the method 700 is performed on a processor executing code stored in a non-transitory computer-readable medium (e.g., a memory). In an exemplary implementation, the techniques of method 700 are performed at an electronic device (e.g., an HMD) having a processor.

At block 702, the method 700 obtains sensor data of a head or a face from one or more sensors of an electronic device in a physical environment that includes a light source, where the sensor data corresponds to reflections of diffuse light off of the head or the face received by the one or more sensors. For example, a device (e.g., such as device 10, or an HMD such as device 900 as further discussed herein with reference to FIG. 9) may obtain sensor data of a head or a face (or another portion) of a user (e.g., user 25) from one or more sensors (e.g., light intensity camera(s) 514, depth camera(s) 516, UV/IR sensor(s) 520, or the like) that are capable of detecting light reflections.

In some implementations, the first sensor is a multiwavelength ambient light sensor. In some implementations, the first sensor is configured to generate one or more luminance and/or chrominance values corresponding to diffused light from the light source.

At block 704, the method 700 determines, based on the reflections of diffuse light from the head or the face, that the physical environment is a first type of environment or a second type of environment based on a set of criteria. For example, this may involve determining if light source is sunlight, artificial light, or sunlight filtered through a window based on multiwavelength data of a multiwavelength ALS. Additionally, or alternatively, in some implementations, this may involve distinguishing a light source based on spectral properties (IR, VL) and frequency of the light data. Additionally, or alternatively, in some implementations, this may involve detecting light reflected of a user via an HMD, a temporal axis (over time, 1 min, 5 min etc.) to help determine location lighting information, a time of day, a scene understanding, and the like, or a combination of one or more of the aforementioned techniques.

In some implementations, the method 700 determines a reflective property of the reflection off of the face or the head of the user based on the sensor data. For example, the reflective property (e.g., a spectral property) may be indicative of an amount of reflection of the light from the fundus of the eye. The fundus is the back surface of the eye opposite the opening/pupil and may include the retina, macula, optic disc, fovea and blood vessels. In some implementations, an amount of the reflection is indicative of a spectral property associated with artificial light (indoors), sunlight (outdoors), or lit by sunlight filtered through windows (indoors). In some implementations, the amount of reflection detected increases the more the fundus aligns with a sensor direction.

In some implementations, determining that the physical environment is the first type of environment or the second type of environment is based on determining that the light source is sunlight, artificial light, or sunlight filtered through a window. For example, determining that the environment is outside or inside may be based on multiwavelengths data (e.g., from a multiwavelength ALS), lux values, and the like. In some implementations, the first type of environment includes an indoor environment. In some implementations, the second type of environment includes an outdoor environment.

In some implementations, the set of criteria includes determining that the physical environment is a first known location or a second known location based on the first set of light data and the second set of data. For example, some techniques described herein may determine between two different known indoor locations (e.g., office vs home). In some implementations, distinguishing between two different known indoor locations may be based on a determined "fingerprint" of the light data (intensities or wavelengths) associated with that environment. For example, the office may have a particular type of lighting (e.g., fluorescent tube lights), and a room(s) in a user's home may have a different type of lighting (e.g., LED lights). In some implementations, the spectral properties of each different environment may be known (e.g., stored data) and recognized quickly based on a determined "fingerprint" (e.g., spectral/multiwavelength properties) of the light data (e.g., via a low powered multiwavelength ALS).

In some implementations, the set of criteria includes a temporal axis and determining that the physical environment is the first type of environment or the second type of environment is based on an analysis of multiple temporal stages along the temporal axis.

In some implementations, determining that the physical environment is a first type of environment or a second type of environment is further based on a time of day. For example, based on a user's known or learned scheduled, a user may be more likely to be inside his or her office or place of work between 8 am and 5 pm.

In some implementations, determining that the physical environment is a first type of environment or a second type of environment is further based on a second set of sensor data. In some implementations, the second set of data includes depth data and light intensity image data obtained during a scanning process. In some implementations, determining that the physical environment is the first type of environment or the second type of environment is based on determining a scene understanding of the physical environment based on the depth data and light intensity image data. For example, a user may scan the environment that he or she is located in, and based on the image data (e.g., light intensity and/or depth), and the first set of data (e.g., ALS data) the techniques described herein can determine a type of environment based on generating a scene understanding of the environment. For example, a scene understanding may be used to determine a context of the experience and/or the environment (e.g., create a scene understanding to determine the objects or people in the content or in the environment, where the user is, what the user is watching, etc.).

Figure 8:
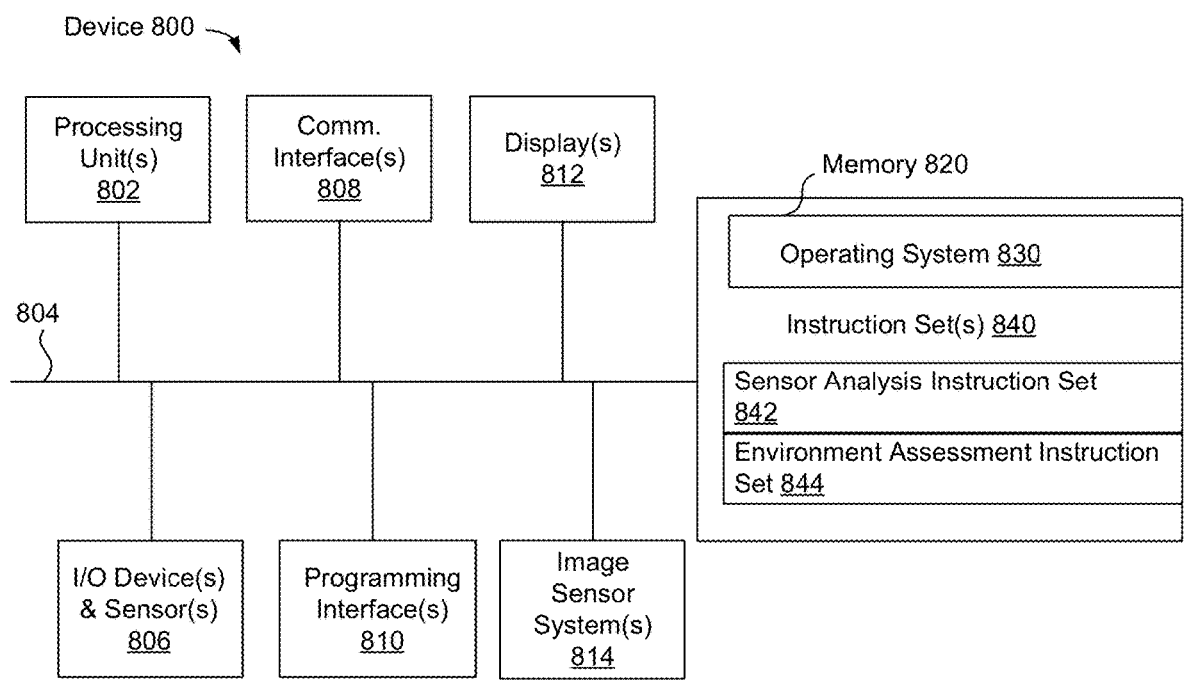
FIG. 8 is a block diagram illustrating device components of an exemplary device according to some implementations.

FIG. 8 is a block diagram of an example device 800. Device 800 illustrates an exemplary device configuration for device 10. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 10 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 10 includes a single display. In another example, the device 10 includes a display for each eye of the user.

In some implementations, the one or more image sensor systems 814 are configured to obtain image data that corresponds to at least a portion of the physical environment. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include a sensor analysis instruction set 842 and an environment instruction set 844. The instruction set(s) 840 may be embodied a single software executable or multiple software executables.

In some implementations, the sensor analysis instruction set 842 is executable by the processing unit(s) 802 to receive sensor data from a sensor (e.g., sensors 510) and determine a reflective property (e.g., a spectral property) of the sensor data. To these ends, in various implementations, the instruction includes instructions and/or logic therefor, and heuristics and metadata therefor.

In some implementations, the environment instruction set 844 is executable by the processing unit(s) 802 to assess a type of environment based on the sensor data analysis using one or more of the techniques discussed herein or as otherwise may be appropriate. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 8 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

Figure 9:
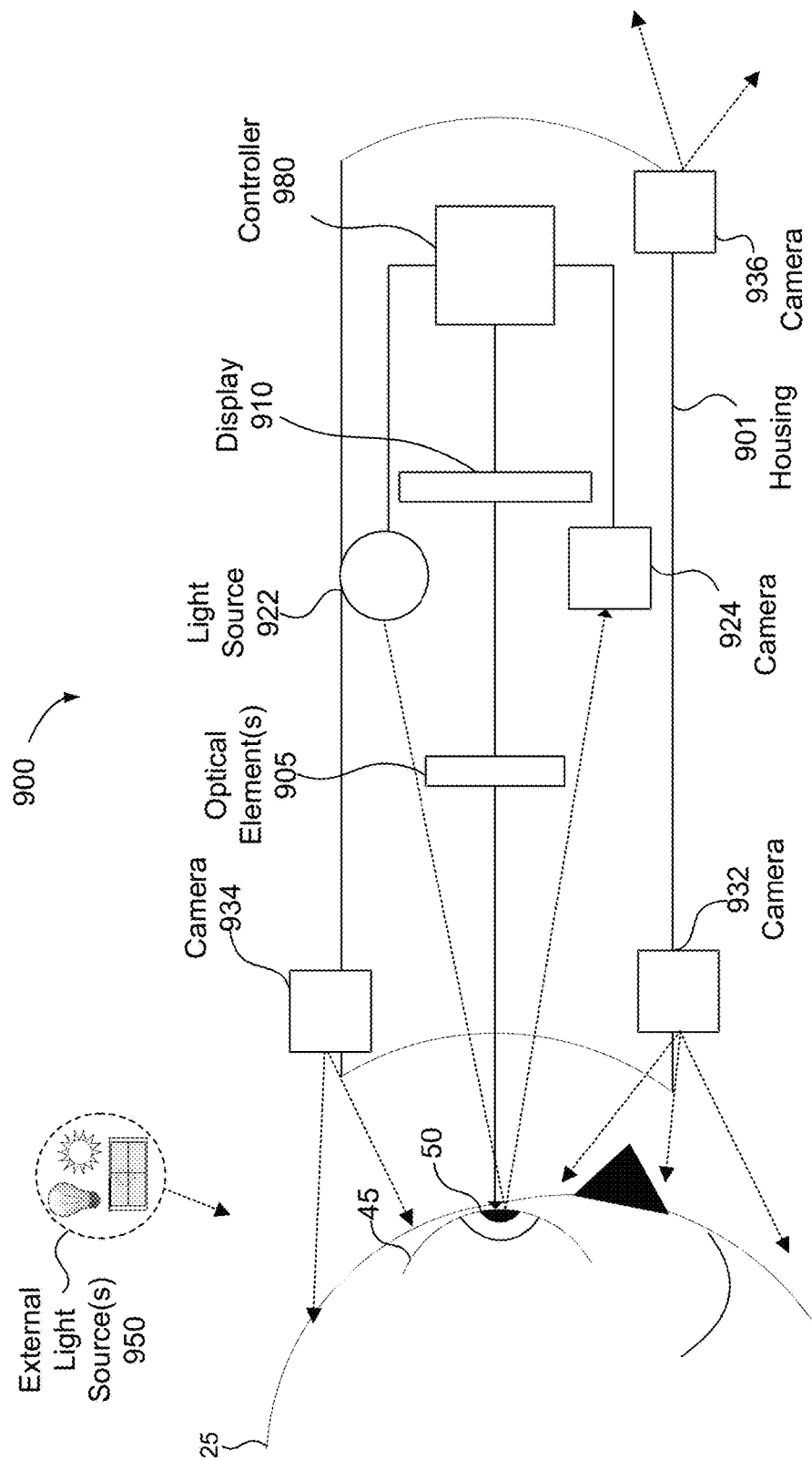
FIG. 9 is a block diagram of an example head-mounted device (HMD) in accordance with some implementations.

FIG. 9 illustrates a block diagram of an exemplary head-mounted device 900 in accordance with some implementations. The head-mounted device 900 includes a housing 901 (or enclosure) that houses various components of the head-mounted device 900. The housing 901 includes (or is coupled to) an eye pad (not shown) disposed at a proximal (to the user 25) end of the housing 901. In various implementations, the eye pad is a plastic or rubber piece that comfortably and snugly keeps the head-mounted device 900 in the proper position on the face of the user 25 (e.g., surrounding the eye of the user 25).

The housing 901 houses a display 910 that displays an image, emitting light towards or onto the eye of a user 25. In various implementations, the display 910 emits the light through an eyepiece having one or more optical elements 905 that refracts the light emitted by the display 910, making the display appear to the user 25 to be at a virtual distance farther than the actual distance from the eye to the display 910. For example, optical element(s) 905 may include one or more lenses, a waveguide, other diffraction optical elements (DOE), and the like. For the user 25 to be able to focus on the display 910, in various implementations, the virtual distance is at least greater than a minimum focal distance of the eye (e.g., 7 cm). Further, in order to provide a better user experience, in various implementations, the virtual distance is greater than 1 meter.

The housing 901 also houses a tracking system including one or more light sources 922, camera 924, camera 932, camera 934, camera 936, and a controller 980. The one or more light sources 922 emit light onto the eye of the user 25 that reflects as a light pattern (e.g., a circle of glints) that can be detected by the camera 924. Based on the light pattern, the controller 980 can determine an eye tracking characteristic of the user 25. For example, the controller 980 can determine a gaze direction and/or a blinking state (eyes open or eyes closed) of the user 25. As another example, the controller 990 can determine a pupil center, a pupil size, or a point of regard for a pupil 50. Thus, in various implementations, the light is emitted by the one or more light sources 922, reflects off the eye 45 of the user 25, and is detected by the camera 924. In various implementations, the light from the eye of the user 25 is reflected off a hot mirror or passed through an eyepiece before reaching the camera 924.

The display 910 emits light in a first wavelength range and the one or more light sources 922 emit light in a second wavelength range. Similarly, the camera 924 detects light in the second wavelength range. In various implementations, the first wavelength range is a visible wavelength range (e.g., a wavelength range within the visible spectrum of approximately 400-700 nm) and the second wavelength range is a near-infrared wavelength range (e.g., a wavelength range within the near-infrared spectrum of approximately 700-1400 nm).

In various implementations, eye tracking (or, in particular, a determined gaze direction) is used to enable user interaction (e.g., the user 25 selects an option on the display 910 by looking at it), provide foveated rendering (e.g., present a higher resolution in an area of the display 910 the user 25 is looking at and a lower resolution elsewhere on the display 910), or correct distortions (e.g., for images to be provided on the display 910).

In various implementations, the one or more light sources 922 emit light towards the eye of the user 25 which reflects in the form of a plurality of glints.

In various implementations, the camera 924 is a frame/shutter-based camera that, at a particular point in time or multiple points in time at a frame rate, generates an image of the eye of the user 25. Each image includes a matrix of pixel values corresponding to pixels of the image which correspond to locations of a matrix of light sensors of the camera. In implementations, each image is used to measure or track pupil dilation by measuring a change of the pixel intensities associated with one or both of a user's pupils.

In various implementations, the camera 924 is an event camera including a plurality of light sensors (e.g., a matrix of light sensors) at a plurality of respective locations that, in response to a particular light sensor detecting a change in intensity of light, generates an event message indicating a particular location of the particular light sensor.

In various implementations, the camera 932, camera 934, and camera 936 are frame/shutter-based cameras that, at a particular point in time or multiple points in time at a frame rate, can generate an image of the face of the user 25 or capture an external physical environment. For example, camera 932 captures images of the user's face below the eyes, camera 934 captures images of the user's face above the eyes, and camera 936 captures the external environment of the user (e.g., environment 100 of FIG. 1). The images captured by camera 932, camera 934, and camera 936 may include light intensity images (e.g., RGB) and/or depth image data (e.g., Time-of-Flight, infrared, etc.).

Sensors of the HMD 900 such as camera 932, camera 934, and other sensors not shown (e.g., a multiwavelength ALS), may be used to detect reflections of diffuse light from the head or the face of the user 25 from the one or more lights sources 950 using one or more techniques described herein. The one or more lights sources 950 may include different light sources such as artificial light (e.g., fluorescent, incandescent, LED, discharge lamp, etc.) and sunlight (e.g., from outside or as filtered through a window) as detected by the one or more sensors.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device having a processor, a first sensor, and a second sensor:
obtaining a first set of light data from the first sensor of the device in a physical environment comprising a light source, the first set of light data identifies diffuse light in each of multiple light wavelength ranges that is received by the first sensor in the physical environment;
obtaining a second set of data from the second sensor in the physical environment; and
determining, based on the first set of light data and the second set of data, that the physical environment is a first type of environment or a second type of environment based on a set of criteria.

2. The method of claim 1, wherein the first sensor is a multiwavelength ambient light sensor (ALS) that is configured to identify the diffused light in each of the multiple light wavelength ranges.

3. The method of claim 1, wherein the first sensor is configured to generate one or more luminance and/or chrominance values corresponding to diffused light from the light source.

4. The method of claim 1, wherein the set of criteria comprises a temporal axis and determining that the physical environment is the first type of environment or the second type of environment is based on an analysis of multiple temporal stages along the temporal axis.

5. The method of claim 1, wherein determining that the physical environment is a first type of environment or a second type of environment is based on a time of day.

6. The method of claim 1, wherein the second sensor comprises an infrared (IR) sensor and the second set of data comprises IR data.

7. The method of claim 1, wherein the second sensor comprises an ultraviolet (UV) sensor and the second set of data comprises UV data.

8. The method of claim 1, wherein the second set of data comprises location information.

9. The method of claim 1, wherein the second set of data comprises depth data and light intensity image data obtained during a scanning process.

10. The method of claim 9, wherein determining that the physical environment is the first type of environment or the second type of environment is based on determining a scene understanding of the physical environment based on the depth data and light intensity image data.

11. The method of claim 1, wherein determining that the physical environment is the first type of environment or the second type of environment is based on determining that the light source is sunlight, artificial light, or sunlight filtered through a window.

12. The method of claim 1, wherein determining that the light source is sunlight, artificial light, or sunlight filtered through a window is based on a comparison of the first set of light data with stored light spectrum profiles that indicate types of light that include sunlight, artificial light, and sunlight filtered through a window.

13. The method of claim 1, wherein determining that the physical environment is the first type of environment or the second type of environment comprises:
obtaining one or more first light spectrum profiles associated with the first type of environment and one or more second light spectrum profiles associated with the second type of environment;
identifying spectral properties of a light spectrum profile associated with the first set of light data; and
determining that the physical environment is the first type of environment or the second type of environment based on a comparison of the spectral properties of the light spectrum profile associated with the first set of light data with spectral properties associated with the one or more first light spectrum profiles associated with the first type of environment and the one or more second light spectrum profiles associated with the second type of environment.

14. The method of claim 13, wherein the light spectrum profiles are updated based on historical data.

15. The method of claim 1, wherein the first type of environment comprises an indoor environment.

16. The method of claim 1, wherein the second type of environment comprises an outdoor environment.

17. The method of claim 1, wherein the set of criteria comprises determining that the physical environment is a first known location or a second known location based on the first set of light data and the second set of data.

18. A device comprising:
a first sensor;
a second sensor;
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining a first set of light data from the first sensor of the device in a physical environment comprising a light source, the first set of light data identifies diffuse light in each of multiple light wavelength ranges that is received by the first sensor in the physical environment;
obtaining a second set of data from the second sensor in the physical environment; and
determining, based on the first set of light data and the second set of data, that the physical environment is a first type of environment or a second type of environment based on a set of criteria.

19. The device of claim 18, wherein the first sensor is a multiwavelength ambient light sensor (ALS).

20. A non-transitory computer-readable storage medium, storing program instructions executable on a device including one or more processors to perform operations comprising:
obtaining a first set of light data from a first sensor of the device in a physical environment comprising a light source, the first set of light data identifies diffuse light in each of multiple light wavelength ranges that is received by the first sensor in the physical environment;

obtaining a second set of data from a second sensor in the physical environment; and determining, based on the first set of light data and the second set of data, that the physical environment is a first type of environment or a second type of environment based on a set of criteria.

21. The method of claim 1, wherein determining that the physical environment is the first type of environment or the second type of environment is based on the identified diffused light in each light wavelength range of the identified multiple light wavelength ranges.

* * * * *